United States Patent [19]
Cho et al.

[11] Patent Number: 5,469,450
[45] Date of Patent: Nov. 21, 1995

[54] NONVOLATILE MEMORY DEVICE INCLUDING MULTI-ECC CIRCUIT

[75] Inventors: Sung-Hee Cho; Hyong-Gon Lee, both of Suwon, Rep. of Korea

[73] Assignee: Samsung Electronics Co., Ltd., Suwon, Rep. of Korea

[21] Appl. No.: 99,331

[22] Filed: Jul. 30, 1993

[30] Foreign Application Priority Data

Jul. 30, 1992 [KR] Rep. of Korea .................. 13685/1992

[51] Int. Cl.⁶ .................................................. G06F 11/10
[52] U.S. Cl. ........................................ 371/40.4; 371/21.1
[58] Field of Search ............................. 371/21.1, 38.1, 371/40.1, 40.2, 40.3, 40.4

[56] References Cited

U.S. PATENT DOCUMENTS

| | | | |
|---|---|---|---|
| 4,706,249 | 11/1987 | Nakagawa et al. .................. | 371/38 |
| 4,878,220 | 10/1989 | Hashimoto ............................. | 371/40.1 |
| 4,937,830 | 6/1990 | Kawashima et al. .................. | 371/40.1 |
| 5,056,089 | 10/1991 | Furuta et al. .......................... | 371/21.1 |
| 5,313,425 | 5/1994 | Lee et al. .............................. | 371/21.1 |

*Primary Examiner*—Roy N. Envall, Jr.
*Assistant Examiner*—Thomas E. Brown
*Attorney, Agent, or Firm*—Charles R. Donohoe; Stephen R. Whitt

[57] ABSTRACT

A nonvolatile memory device containing sub memory arrays and distinct associated peripheral sub array circuits containing error checking and correction circuits that are similarly positioned according to the sub array. The memory device is configured so that a single mask change allows the device to be manufactured as a normal mode device or a page mode device.

15 Claims, 5 Drawing Sheets

NONVOLATILE MEMORY DEVICE INCLUDING MULTI-ECC CIRCUIT

BACKGROUND OF THE INVENTION

The present invention relates to a semiconductor memory device employing an error checking and correcting (ECC) circuit, and more particularly to a multi-ECC circuit embedded in a semiconductor memory device having a plurality of sub memory cell arrays.

As the packing density of semiconductor memory devices increases, bit failures or syndrome bits due to defective manufacturing steps or electrical stress surges can significantly reduce yield and reliability of the semiconductor memory device.

In nonvolatile memory devices, e.g., electrically erasable and programmable read only memory (EEPROM) or mask ROM which require high reliability, use of the ECC circuitry is a standard practice. Although ECC circuitry creates troubles, such as an increase of the chip size due to added parity cells and speed delay due to correction circuits, the increased reliability and yield compensate for these difficulties.

In particular, redundancy is difficult in a highly integrated ROM device, so ECC circuits enhance the yield and reliability.

ECC circuits generally work as follows. During an input operation, corresponding parity bits are generated and then both the input data and the parity bits are stored. During an output operation, the stored data and the corresponding parity bits are compared with each other, thereby detecting and correcting any error.

The number of the parity bits required varies according to the number of data bits. this number is determined in accordance with Hamming code, which is attained by:

$$2^k \leq m+k+1$$

where "m" denotes the number of data bits and "k" denotes number of parity bits. Therefore, according to the above equation, when the number of data bits is eight, the number of equation parity bits is four. Similarly, when the number of data bits is sixteen, the number of required parity bits is five.

A block diagram of a conventional semiconductor memory device having an ECC circuit for 128 bits is shown in FIG. 1. The number of parity bits is eight. The semiconductor memory device shown in FIG. 1 has a memory cell array 10A, sense amplifier group 20A for sensing data of the memory cell array 10A, latch circuit 30A for latching the output of the sense amplifier group 20A, an ECC circuit 40A for repairing a syndrome bit, an output decoder 50A for sequentially accessing the 128 bits by 16 bits by means of pre-decoding signals SAD0–SAD7 generated from a pre-decoder 80A, and a data output buffer 60A for providing output data by 16 bits to an output pad 70A.

In a page mode data access operation of the semiconductor memory device shown in FIG. 1, the data of 128 bits is sequentially output 16 bits at a time after passing the sense amplifier group 20A, the latch circuit 30A and the ECC circuit 40A, so that the data access can be performed in high speed. However, devices which operate also in a normal mode data access operation, since the sense amplifier group 20A, the latch circuit 30A and ECC circuit 40A are also all simultaneously activated. Thus, power dissipation is the same as during page mode operation, although these devices will not operate in a page mode.

SUMMARY OF THE INVENTION

Accordingly, it is an object of the present invention to provide an ECC-embedded semiconductor memory device reducing power dissipation during a normal mode data access operation.

It is another object of the present invention to provide semiconductor memory device capable of being configured as a normal mode device and a page mode device in a simple manner.

The present invention realizes a multi-ECC circuit, wherein the a plurality of ECC circuits correspond to a plurality of sub cell arrays. Furthermore, the architecture of the semiconductor memory device makes the conversion between the normal mode and page mode be possible by the change of a metal layer connection relating to block selecting portions. As a result, the present invention is advantageous for reducing the power dissipation in a semiconductor memory device having an ECC function.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 2:
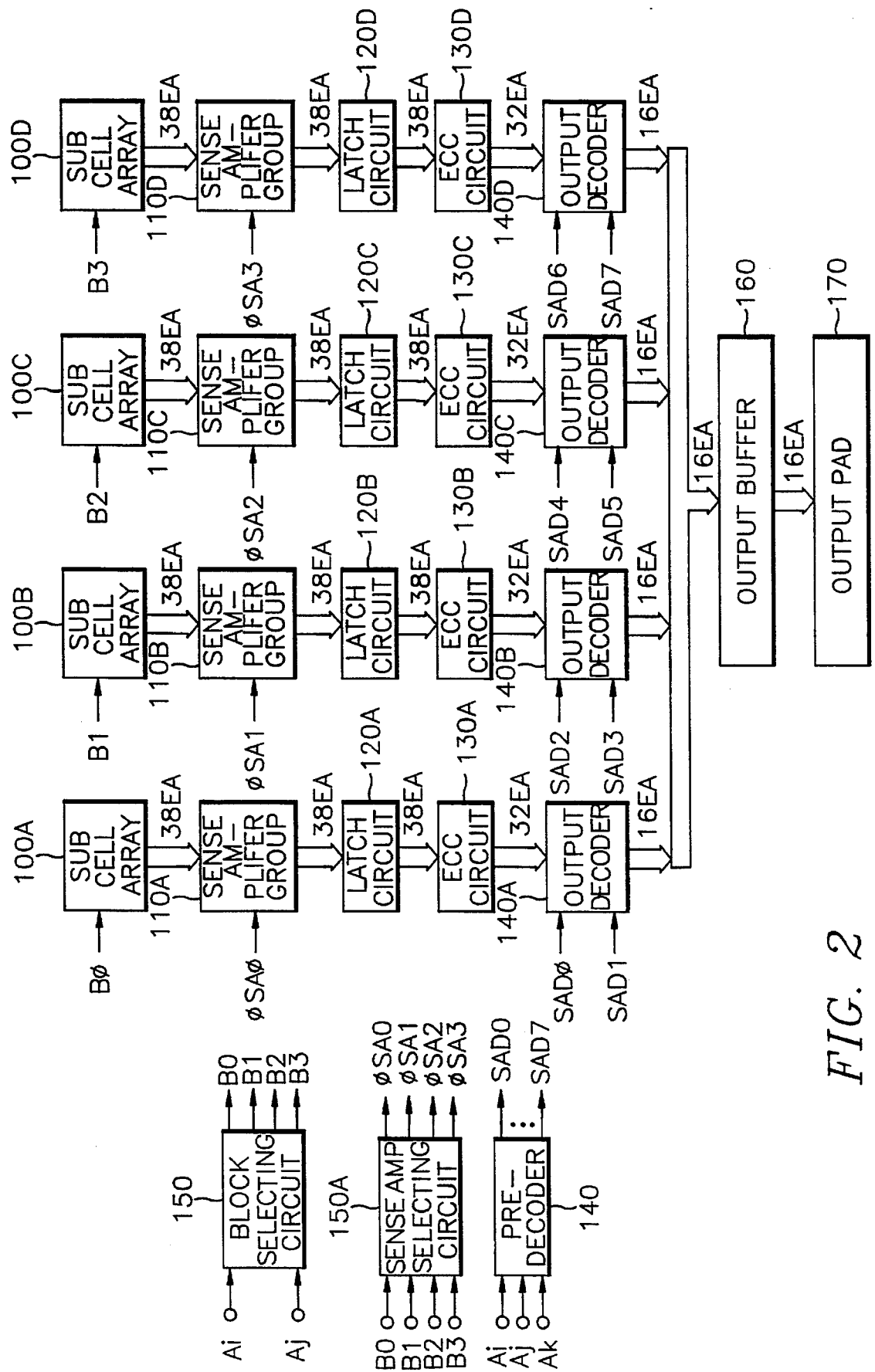
FIG. 2 is a functional block diagram of a semiconductor memory device employing a multi-ECC circuit, when the semiconductor memory device according to the present invention is put into a normal mode data access.

FIG. 2 shows an functional block diagram of a semiconductor memory device including a multi-ECC circuit according to the present invention that operates in a normal mode data access operation (hereinafter "normal mode"). A memory cell array is divided into four sub cell arrays 100A, 100B, 100C and 100D, each having normal cells and parity cells. The peripheral circuitry corresponding to the sub cell arrays is also divided into four sections and contains four sense amplifier groups 110A, 110B, 110C and 110D, each sense amplifier group having a normal sense amplifiers and parity sense amplifiers, being connected to the sub cell arrays 100A, 100B, 100C and 100D, respectively; four latch circuits 120A, 120B, 120C and 120D for latching output signals supplied from the sense amplifier groups 110A, 110B, 110C and 110D, respectively; four ECC circuits 130A, 130B, 130C and 130D (termed as a whole, "multi-ECC circuit") connected to respective four sense amplifier groups 110A, 110B, 110C and 110D for repairing syndrome bits; output decoders 140A, 140B, 140C and 140D respectively connected to the ECC circuits 130A, 130B, 130C and 130D; an output buffer 160 for receiving output signals of the output decoders 140A, 140B, 140C and 140D; and an output pad 170.

In addition, there is provided a block selecting circuit 150 receiving address signals Ai and Aj in a normal mode and which generates block selecting signals B0–B3 to select the sub cell arrays 100A, 100B, 100C or 100D. In a page mode the inputs of the block selecting circuit 150 is connected to a power supply voltage Vcc, as will be described hereinafter. A sense amplifier selecting circuit 150A receives the block selecting signals B0–B3 from the block selecting circuit 150 and thereby generates sense amplifier selecting signals φSA0–φSA3 to select the sense amplifier groups 110A, 110B, 110C and 110D. A pre-decoder 140 receives address signals Ai, Aj and Ak and thereby generates pre-decoding signals SAD0–SAD7 which are applied to output decoders 140A–140D, to cause each of the output decoders to divide 32 bit output signals from each of the ECC circuits 130A–130D into 16 bit data signals. Each 16-bit data signal is then transferred an output buffer 160 in turn.

Figure 3A:
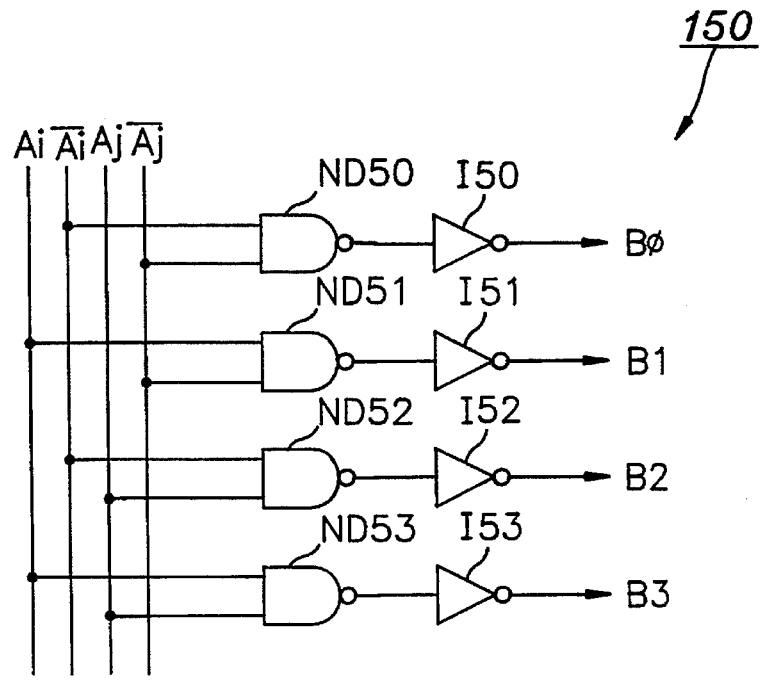
FIG. 3A is a circuit diagram of first decoder shown in FIG. 2.

The block selecting circuit 150, as shown in FIG. 3A, consists of NAND gates ND50–ND53 and receives address signals Ai and Aj in the normal mode. Inverters I50–I53 receive the output signals generated from the NAND gates ND50–ND53.

Figure 3B:
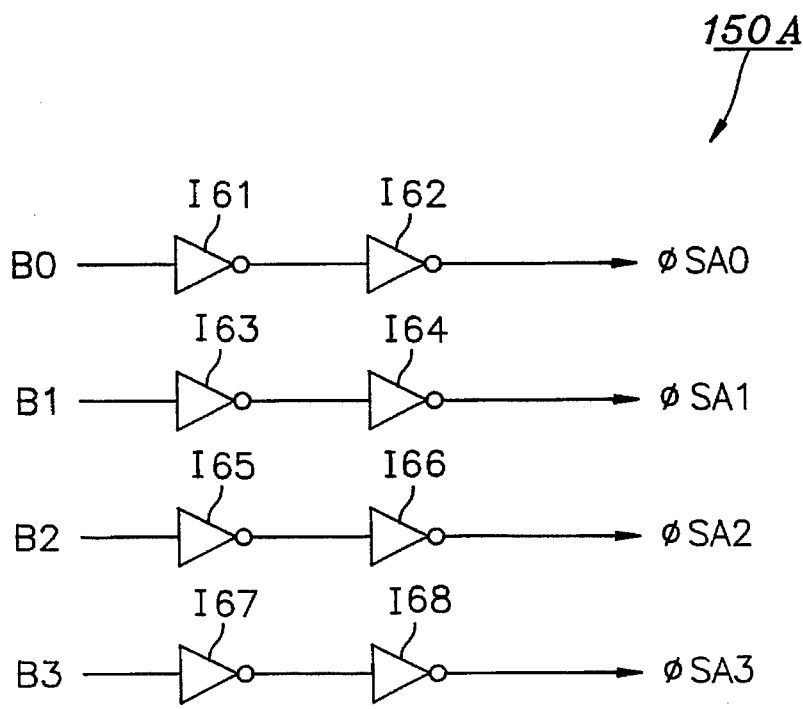
FIG. 3B is a circuit diagram of address transition detector shown in FIG. 2.

The sense amplifier selecting circuit 150A has four identical circuits, as shown in FIG. 3B, corresponding to the four block selecting signals B0–B3, each consisting of two inverters. Inverters I61, I63, I65 and I67 receive the block selecting signals B0 to B3, and inverters I62, I64, I66 and I68 generate sense amplifier selecting signals φSA0–φSA3 from the output signals of the inverters I61, I63, I65 and I67.

Figure 3C:
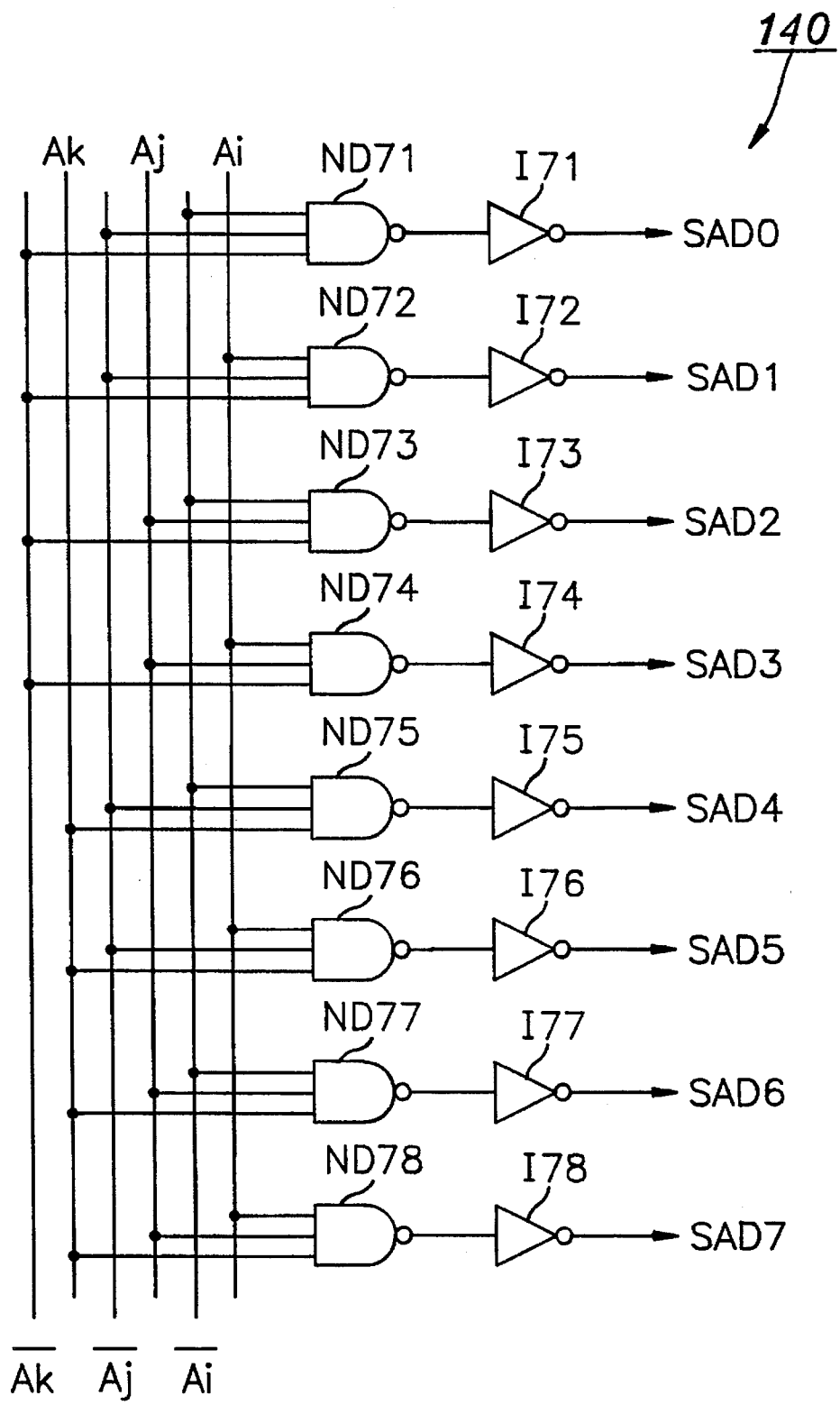
FIG. 3C is a circuit diagram of second decoder shown in FIG. 2.

The pre-decoder 140, as shown in FIG. 3C, consists of NAND gates ND71 to ND78 which each receive address signals Ai, Aj and Ak, and inverters I71 to I78, which generate pre-decoding signals SAD0 to SAD7 in response to the output of the associated one of NAND gates ND71 to ND78 to control the quantity of data passed through the output decoders 140A, 140B, 140C and 140C in FIG. 2.

Since the sub cell arrays are divided into four sections, the sense amplifier groups, latch circuits, ECC circuits and output decoders are respectively divided into four sections to correspond to the number of the sub cell arrays. In FIG. 2, the reason of requiring 38 sense amplifiers for each block in the sense amplifier groups is in that 32 sense amplifiers are required for sensing normal data, and six parity data sense amplifiers are need for repairing single syndrome bits.

Figure 1:
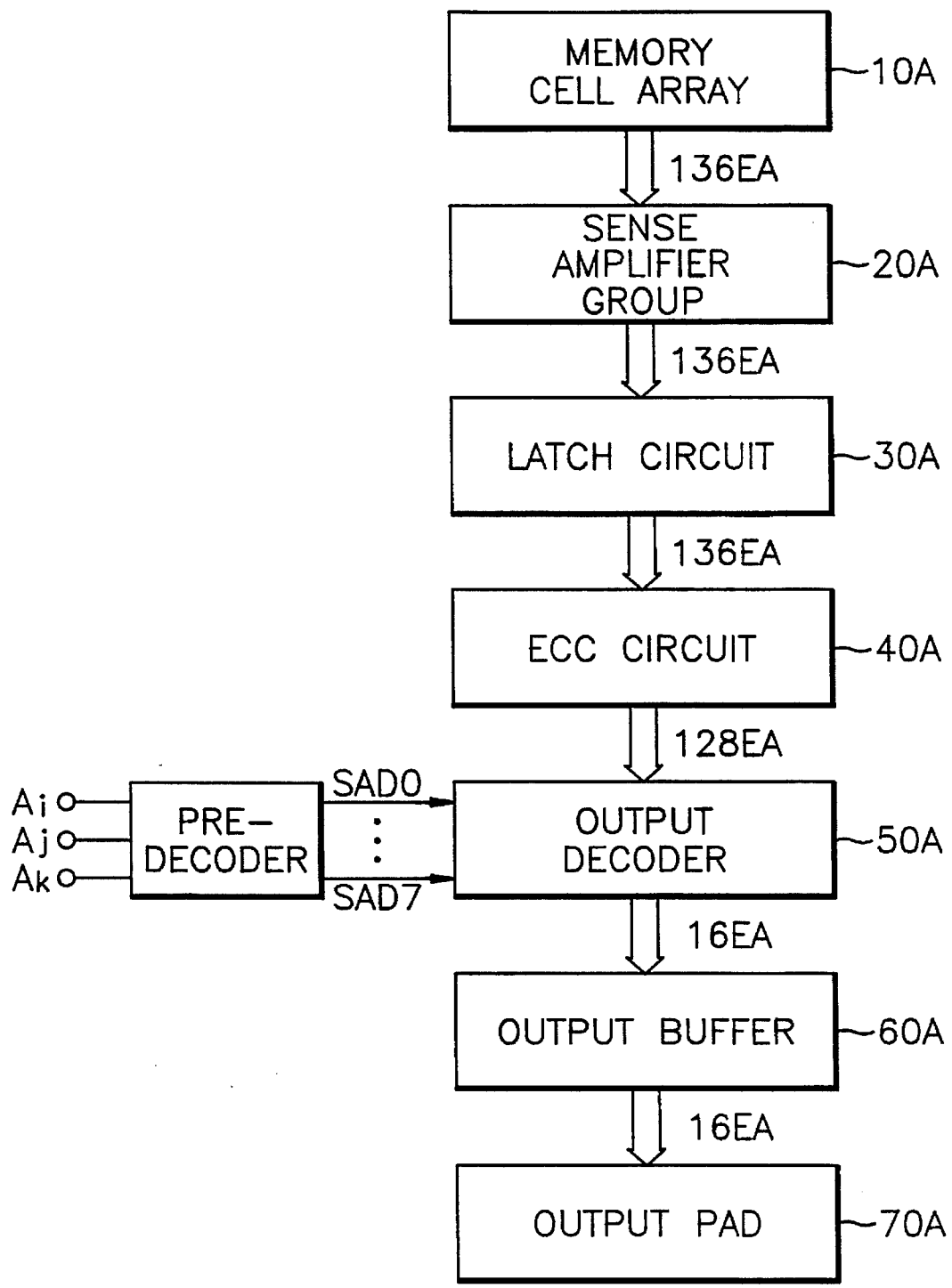
FIG. 1 is a functional block diagram of a semiconductor memory device employing a conventional ECC circuit for 128 bits.

An ECC circuit is provided in each sub cell array for repairing the syndrome bits. Since four sub cell arrays 100A, 100B, 100C and 100D are independently operated each of the ECC circuits 130A, 130B, 130C and 130D is separately provided within each of sub cell arrays 100A, 100B, 100C and 100D. Thus, each ECC circuit belonging to a certain sub cell array operates free from interference with an adjacent sense amplifier group belong to another sub cell array. Therefore, instead of the ECC circuit operating upon a combination of the output signals from 128 normal data sense amplifiers as in the conventional circuit shown in FIG. 1, each ECC circuit according to the present invention operates on a combination of output signals from 32 normal data sense amplifiers, thereby requiring one such ECC circuit per sub cell array.

Figure 4:
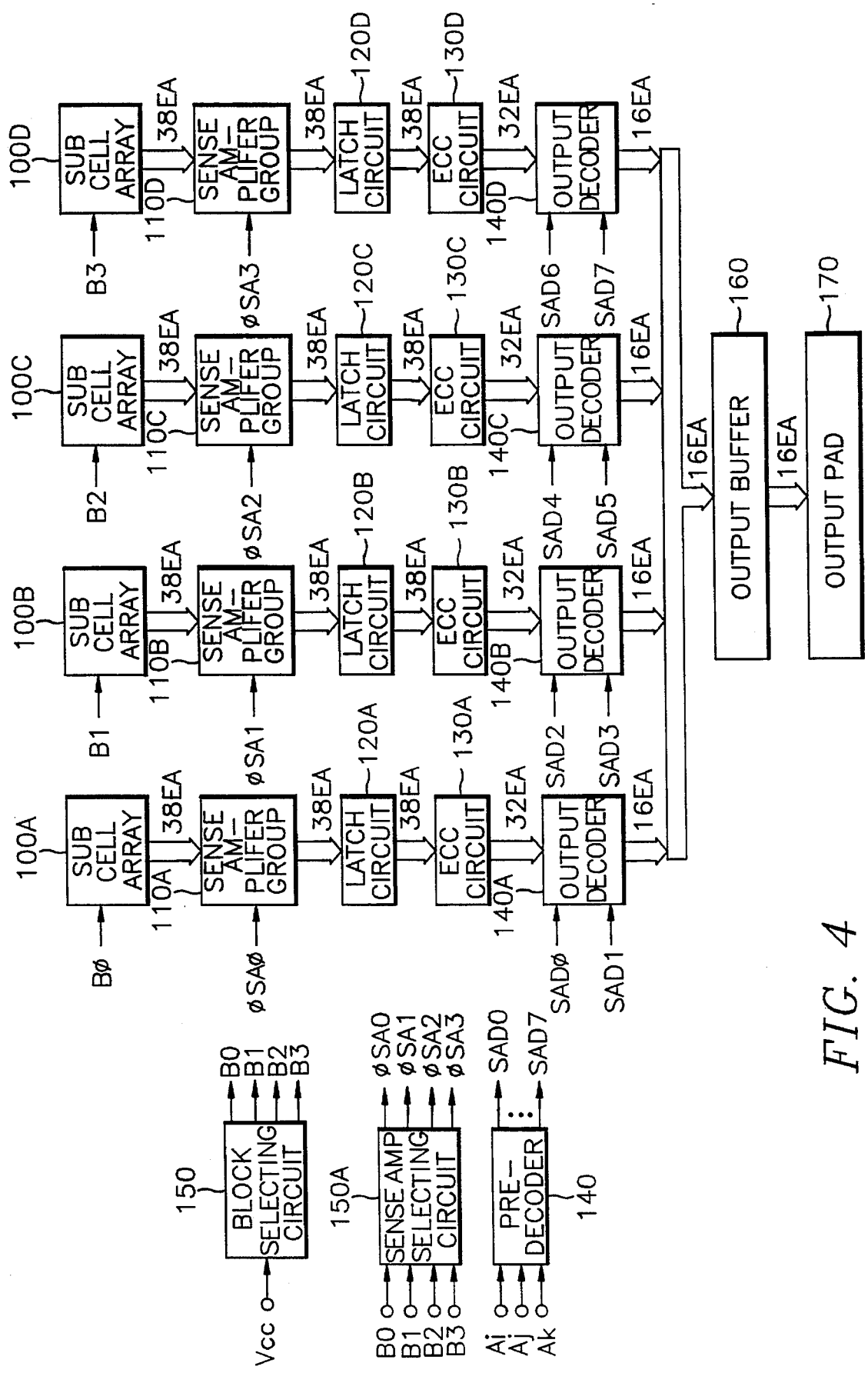
FIG. 4 is a functional block diagram of a semiconductor employing a multi-ECC circuit, when the semiconductor memory device according to the present invention is put into a page mode data access operation.

Referring to FIG. 4, a functional block diagram of the semiconductor memory device manufacturing to operate in a page mode data access operation (hereinafter briefly referred to as "page mode") is shown. Its architecture is the same as that of FIG. 2, except that the input lines connected to the block selecting circuit 150 are instead connected to the power supply voltage Vcc instead of address signal inputs Ai and Aj. This connection change of the block selecting circuit 150 can be achieved by means of changing the interconnection pattern of the metal layer that defines the connection of input terminals of the block selecting circuit 150. This connection can be changed during the metal layer forming step during the manufacturing process for the semiconductor memory device and requires only a simple mask change.

Operations of the memory in the normal mode and the page mode according to the construction shown in FIG. 2 and FIG. respectively 4 will be described below.

In the normal mode, address signals Ai and Aj alternatively select one of the sub cell arrays. Assuming that the sub cell array 100A is selected by the block selecting signal B0 which is activated, data read from the sub cell array 100A are sensed and amplified in the sense amplifier group 110A. Normal data are sensed by the normal sense amplifiers and parity data are sensed by the parity sense amplifiers in the sense amplifier group 110A. The data are then latched in the latch circuit 120A, and passed through the ECC circuit 130A. At this time, if a syndrome bit exists, it is repaired in the ECC circuit 130A. Thereafter, the data are decoded in the output decoder 140A and applied to the output buffer 160. The non-selected sub cell arrays 100B, 100C and 100D, sense amplifier groups 110B, 110C and 110D, latch circuits 120B, 120C and 120D, and output decoders 140B, 140C and 140D are in a disabled state, while the sub cell array 100A is selected which makes the sense amplifier group 110A, latch circuit 120A, ECC circuit 130A and the output decoder 140A be activated. Thus, power dissipation is decreased in contrast to conventional normal mode data access circuits.

When the semiconductor memory device is configured to operate in the page mode (wherein one page equals to eight words in the described embodiment) this configuration can be easily obtained by changing a metal layer pattern located at an upper mask level of the chip. 38-bit data consisting of 32-bit normal data and 6-bit parity data are respectively read from each of the sub cell arrays 100A to 100D, because the block selecting signals B0 to B3 are all activated due to the power supply voltage input at the logic high level to block select circuit 150. Referring to FIG. 3A, since in the page mode all of the input terminals of the NAND gates ND50 to ND53 are coupled to the power supply voltage Vcc, which is at the CMOS logic high level, the block selecting signals B0 to B3 are all at logic high levels, which thus activates all the sub cell arrays 100A to 100D. Thus, all the sense amplifier selecting signals φSA0 to φSA3 are activated to select all the sense amplifier groups 110A to 110D. After parallel data access operations from the sub cell arrays 100A through 100D to the latch circuits 120A through 120D, 38-bit data consisting of 32-bit normal data and 6-bit parity data are applied to each of the ECC circuits 130A through 130D. Syndrome bits within each 32-bit normal group of data are detected and repaired by the 6-bit parity data in each of the ECC circuits. The 32-bit normal data repaired in each of the ECC circuits 130A to 130D are applied to each of the output decoders 140A to 140D. Each of the output decoders divides this 32-bit data into 16-bit data to the output buffer 160, which is controlled by the pre-decoding signals SAD0 to SAD7 generated from the pre-decoder 140 shown in FIG. 3C. The two groups of data access operation through the output decoders 140A to 140D is the same as that of the output decoder 50A in FIG. 1.

Having described the invention, it will be apparent to those skilled in this art that various modifications may be made thereto without departing from the spirit and scope of this invention as defined in the appended claims.

What is claimed is:

1. A nonvolatile memory device comprising:

a memory cell array partitioned into a plurality of sub cell arrays, each of said sub cell arrays having both normal memory cells and parity cells for storing normal cell data and parity cell data;

a plurality of sense amplifier groups, each being connected to a different one of said plurality of sub cell arrays for sensing of cell data from one of said sub cell arrays;

a plurality of error checking and correcting circuits each being connected to a different one of said sense amplifier groups for repairing syndrome bits resulting from cell data stored in one of said sub cell arrays, each of said error checking and correcting circuits being placed in a respective different one of said sub cell arrays; and a plurality of output decoders each being connected to a different one output of said error checking and correcting circuits.

2. A nonvolatile memory device according to claim 1 further comprising a plurality of latch circuits, each latch circuit latching output signals from one of said sense amplifier groups and outputting latched signals to one of said error checking and correcting circuits.

3. A nonvolatile memory device according to claim 1 wherein each of said error checking and correcting circuits operates upon 32 bits of normal cell data.

4. A nonvolatile memory device according to claim 1 further comprising a pre-decoder for controlling data access operations of said output decoders.

5. A nonvolatile memory device comprising:

a memory cell array partitioned into a plurality of sub cell arrays, each of said sub cell arrays having both normal memory cells and parity cells for storing normal cell data and parity cell data;

a plurality of sense amplifier groups, each being connected to a different one of said plurality of sub cell arrays for sensing of cell data from one of said sub cell arrays;

a plurality of error checking and correcting circuits each being connected to a different one of said sense amplifier groups for repairing syndrome bits resulting from cell data stored in one of said sub cell arrays;

a plurality of output decoders each being connected to a different one output of said error checking and correcting circuits; and wherein when said semiconductor memory device is configured to operate in a normal mode only one of said sub cell arrays are selected at a time and when said semiconductor memory device is configured to operate in a page mode, all of said sub cell arrays are selected at the same time.

6. A nonvolatile memory device according to claim 1, further comprising a block selecting circuit for generating block selecting signals for selecting sub cell arrays, wherein when said semiconductor memory device is configured to operate in said normal mode, said block selecting circuit receives a plurality of address signals at a plurality of inputs and when said semiconductor memory device is configured to operate in said page mode, said blocking circuit inputs a high level signal to each of said plurality of inputs.

7. A nonvolatile memory device according to claim 6, wherein when said semiconductor memory device is configured to operate in said normal mode, one of said sense amplifier groups and one of said error checking and correcting circuits which are connected to one of said sub cell array selected by one of said block selection signal, are activated, and when said semiconductor memory device is configured to operate in said page mode, each of said plurality of sense amplifier groups and said plurality of error checking and correcting circuits are activated.

8. A nonvolatile memory device according to claim 5 further comprising a plurality of latch circuits, each latch circuit latching output signals from one of said sense amplifier groups and outputting latched signals to one of said error checking and correcting circuits.

9. A nonvolatile memory device according to claim 5 wherein each of said error checking and correcting circuits operates upon 32 bits of normal cell data.

10. A nonvolatile memory device according to claim 1 further comprising a pre-decoder for controlling data access operations of said output decoders.

11. A nonvolatile memory device configurable in manufacture to operate in one of a normal data access mode and a page data access mode comprising:

a memory cell array partitioned into a plurality of sub cell arrays;

a block selection circuit for selecting said sub cell arrays, said block select circuit including a plurality of metal conductor inputs, said metal conductor inputs electrically isolated from one another when said semiconductor memory device is configured to operate in said normal data access mode and said metal conductor inputs electrically connected together when said semiconductor memory device is configured to operate in said page data access mode; and a plurality of sense amplifier groups each being connected to a different one of said plurality of sub cell arrays for sensing cell data from said sub cell arrays; and means for outputting said cell data connected to said plurality of sense amplifier groups.

12. A nonvolatile memory device according to claim 11 wherein each of said sub cell arrays have normal memory cells and parity cells; and said means for outputting further comprises a plurality of latch circuits, for latching output signals from a different one of each said sense amplifier groups;

an error checking and correcting circuit connected to each of said latch circuits for repairing syndrome bits within said cell data;

an output decoder connected to each of said error checking and correcting circuits; and an output buffer for receiving output signals from said output decoders.

13. A nonvolatile memory device according to claim 11 wherein when said semiconductor memory device is configured to operate in said normal data access mode, said block selecting circuit metal conductor inputs receive a plurality of address signals and when said semiconductor memory device is configured to operate in said page data access mode, said block selecting circuit metal conductor inputs each receive a high level signal.

14. A nonvolatile memory device according to claim 12 wherein when said semiconductor memory device is configured to operate in said normal data access mode, said block selecting circuit metal conductor inputs receive a plurality of address signals and when said semiconductor memory device is configured to operate in said page data access mode, said block selecting circuit metal conductor inputs each receive a high level signal.

15. A nonvolatile memory device according to claim 12 wherein each of said error checking and correcting circuits operates upon 32 bits of normal cell data.

* * * * *